(12) United States Patent
Hawkins

(10) Patent No.: US 11,080,372 B2
(45) Date of Patent: Aug. 3, 2021

(54) PRESENTING PROGRAMS FOR EXECUTION VIA VARIOUS PRESENTABLE MEDIA

(71) Applicant: VMware, Inc., Palo Alto, CA (US)

(72) Inventor: Siavash James Joorabchian Hawkins, Staines-Upon-Thames (GB)

(73) Assignee: VMware, Inc., Palo Alto, CA (US)

(*) Notice: Subject to any disclaimer, the term of this patent is extended or adjusted under 35 U.S.C. 154(b) by 110 days.

(21) Appl. No.: 16/655,207

(22) Filed: Oct. 16, 2019

(65) Prior Publication Data

US 2021/0117516 A1    Apr. 22, 2021

(51) Int. Cl.
| | |
|---|---|
| *G06F 21/12* | (2013.01) |
| *G06K 7/14* | (2006.01) |
| *G06K 7/10* | (2006.01) |

(52) U.S. Cl.
CPC ....... *G06F 21/128* (2013.01); *G06K 7/10564* (2013.01); *G06K 7/10722* (2013.01); *G06K 7/1417* (2013.01); *G06F 2221/0713* (2013.01)

(58) Field of Classification Search
CPC ............................ G06F 21/128; G06K 7/1417
USPC .............................................. 726/28; 235/382
See application file for complete search history.

(56) References Cited

U.S. PATENT DOCUMENTS

| | | | |
|---|---|---|---|
| 9,342,702 B2 * | 5/2016 | Gramelspacher | A61B 5/7285 |
| 2012/0275763 A1 * | 11/2012 | Nagano | G11B 27/105 |
| | | | 386/241 |

\* cited by examiner

*Primary Examiner* — Toan C Ly

(57) ABSTRACT

The disclosure provides for presenting programs in a scripting language. Examples include receiving a data stream containing computer executable instructions in an interpreted language; generating a verification code; publishing, on a media, the data stream and the verification code; reading, using a sensor, the published data stream and verification code at a reader node; receiving user input; based at least on the verification code or the received user input, determining permission to execute, by the reader node, the computer executable instructions; and based at least on determining that execution is permitted by the reader node, executing at least a portion of the computer executable instructions using an interpreted language execution environment on the reader node. For some examples, the media includes a matrix barcode (e.g., a QR code) or a smart card. Some examples leverage a remote verification node and/or a remote library of executable functions.

20 Claims, 7 Drawing Sheets

PRESENTING PROGRAMS FOR EXECUTION VIA VARIOUS PRESENTABLE MEDIA

BACKGROUND

Presented data, such as data stored in smart cards, radio frequency identification (RFID) tags, and printed matrix barcodes (e.g., QR codes), is often associated with predetermined actions. For example, a QR code containing a hyperlink will trigger a browser visit to the hyperlink. However, the actions are simple and generally limited to passing static presented data to a fixed set of applications that use the data in pre-defined ways.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An exemplary solution for presenting programs, for example in JavaScript® and Python®, comprises: receiving a data stream containing computer executable instructions in an interpreted language; generating a verification code; publishing, on a media, the data stream and the verification code; reading, using a sensor, a published data stream and verification code at a reader node; receiving user input; based at least on the verification code or the received user input, determining permission to execute, by the reader node, the computer executable instructions; and based at least on determining that execution is permitted by the reader node, executing at least a portion of the computer executable instructions using an interpreted language execution environment on the reader node. For some examples, the media includes a matrix barcode (e.g., a QR code) or a smart card. Some examples leverage a remote verification node and/or a remote library of executable functions.

BRIEF DESCRIPTION OF THE DRAWINGS

The present description will be better understood from the following detailed description read in the light of the accompanying drawings, wherein.

DETAILED DESCRIPTION

Figure 1:
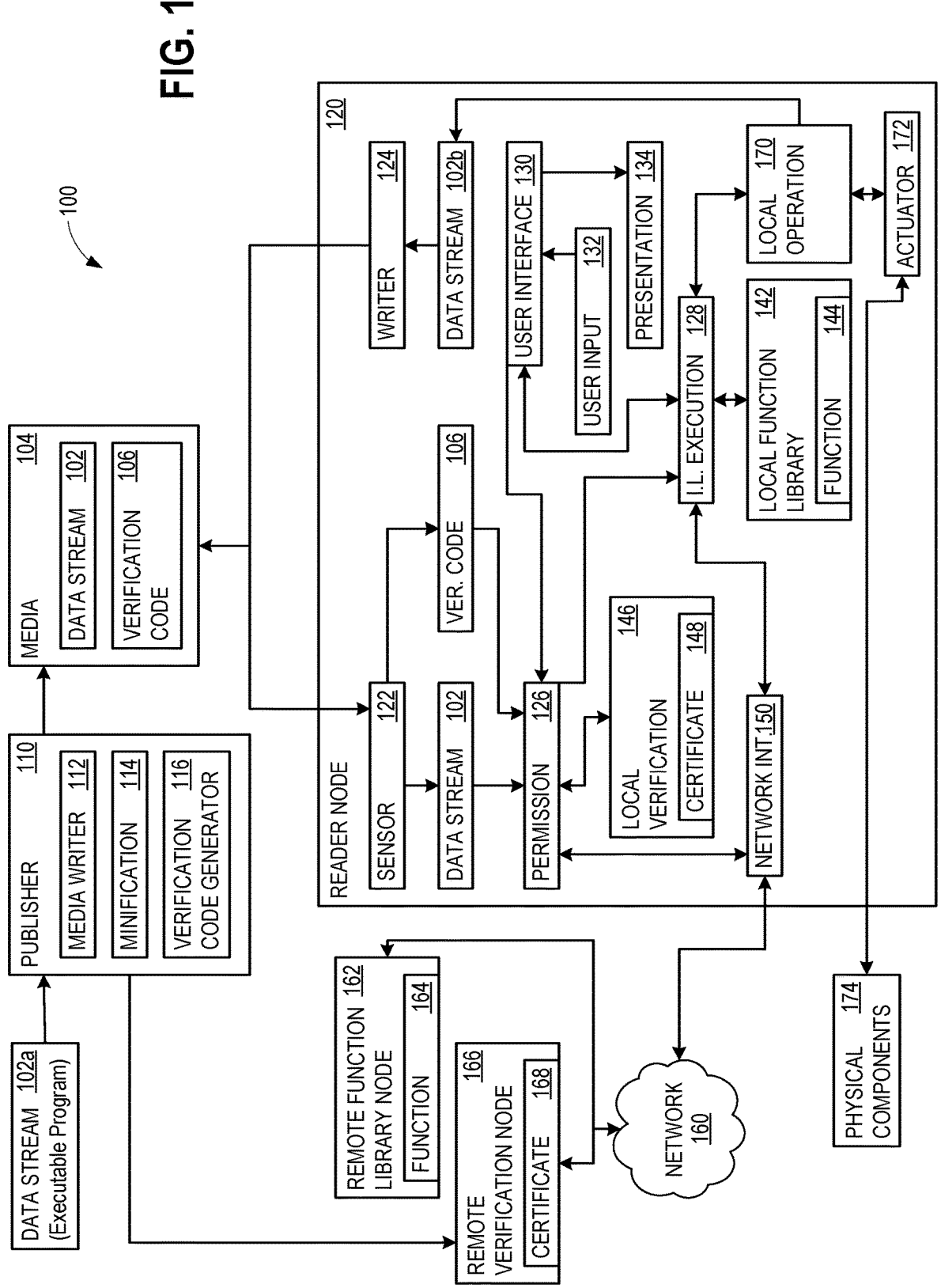
FIG. 1 illustrates a block diagram of an example architecture for presentable programs.

Various aspects of the systems and methods described herein provide at least a solution for executing presented programs, thereby permitting new and complex actions beyond the limited set of actions available with passing presented data to a fixed set of applications. This additional functionality enables significant flexibility, limited primarily by the capacity of the media, which constrains program size. However, some examples expand the capability with minification (which enables the use of larger programs within a media's capacity constraints) and leveraging pre-installed executable functions or remotely-retrieved executable functions. Example media include printed matrix barcodes (e.g., quick response (QR) codes), smart cards, and radio frequency identification (RFID) tags.

In this manner, the disclosure is able to significantly expand the utility of presentable media, such as QR codes, smart cards, RFID tags, and other media types that have historically been associated with small data sets. As an example, a presentable program may be useable as an updater or installer for a user device. In an exemplary operation, a user scans a QR code with a mobile device camera, and the mobile device then executes the program embedded within the QR device to set up, update, or register the mobile device. Protection against execution of malware is provided with the use of a permission check, which enables determination of whether the media reader should be permitted to run a particular presented program, by using a verification code.

The disclosure operates in an unconventional manner by using a pre-positioned interpreted language execution environment, and optionally pre-positioned function definitions in a local library and/or a remote library, along with an execution permission determination (based on a verification code) to limit exposure to malicious logic. It should be understood that any of the examples herein are non-limiting. As such, the present disclosure is not limited to any particular embodiments, aspects, concepts, structures, functionalities or examples described herein. Rather, the present disclosure may be used in various ways that provide benefits and advantages in computing systems including virtualized computing environments.

An architecture for presentable programs may be useable with various media types and readers. In some cases a reader will await the presentation of an accessory or program and then further action. The presented programs will execute on a reader and may be written in a programming language that has some or all of the following characteristics: in common use, well-known, open, and standard. JavaScript® and Python® are examples of suitable programming languages. Both are interpreted languages that run within an interpreted language execution environment. Some Open Source execution environments are available, including Duktape™ and Chromium V8™ for JavaScript®, and CPython™ for Python®. Programs written in common, well-known, open, or standard languages will in general be more flexible and extensible than static data that requires proprietary interpretation.

Due to the restrictive storage capacity of various types of media that are associated with simple data presentation (e.g., QR codes, smart cards, and RFID tags), programs are kept relatively short. A technique in the disclosure for keeping programs short is using references to functions that are either pre-positioned on the reader, or retrievable from a library by the reader. This is often referred to as modularization. Another technique for shortening programs in the disclosure is minification, which is an automatic process that can be applied to source code. The result is shorter source code, but still with valid syntax and identical semantics to the original. Minified code is generally more difficult to read for human programmers.

Multiple use cases are possible, including unlocking doors, such as hotel room or office doors; opening lockers or other containers; showing a customized status display to certain people (such as maintenance workers or managers with the badges containing relevant programs that control a display); activating high value equipment, such as automobiles, manufacturing or printing equipment, and video conferencing units; and selecting a floor or function in an elevator. Such use cases can be accomplished with an actuator, controlled via a General Purpose Input Output (GPIO) connector. Any of those use cases may include entry of a passcode by the user, or a passcode may not be required, depending on the presented program. In some examples, the use case may determine the media type and capacity, based on the size of the program. For example, if a QR code is going to be displayed on a smart phone screen, and held against a fixed reader, there may be less need for error correction than if the program were larger. In contrast, for a use case requiring high security, a smart card with hardware security could be mandated, regardless of program size.

FIG. 1 illustrates a block diagram of an example architecture 100 for presentable programs. Architecture 100 is illustrated as having four computerized nodes: a publisher 110, a reader node 120, a remote function library node 162, and a remote verification node 166. These nodes may be implemented with one or more computing devices 700, which is described in relation to FIG. 7. Alternatively, in some examples, reader node 120 is a Raspberry Pi computer running an interpreted language execution environment 128, with a camera (as a sensor 122); a GPIO connector and a keypad with 0 to 9, A to D, *, and # keys, connected via the GPIO (as a user input component 132); and a multi-line liquid crystal display (LCD) (as a presentation component 134).

An original executable program, for example in JavaScript® or Python® is represented as a data stream 102a. Data stream 102a thus contains computer executable instructions in an interpreted language, and is provided to a publisher 110. An example program is given by:

```
driver = (function(salt, expectedHash){
  var print = console.log
  var passcodeModule = require("modules/passcode.js");
  function init( ) {
    var ok = passcodeModule.verify(salt, expectedHash)
    print(ok ? "OK" : "Failed");
    throw "Finished.",
  }
  function destroy( ){ }
  return {"init": init, "destroy": destroy};
})(
"5NiSmATYWBlnROsMl97G", 276071347
);
```

Publisher 110 contains a media writer 112 for writing a data stream to a media 104, a minification component 114, and a verification code generator 116. In some examples, media writer 112 is a smart card reader/writer; in some examples, media writer 112 is a printer suitable for printing matrix barcodes on various surfaces (e.g., paper); in some examples, media writer 112 is an RFID tag encoder; and in some examples, media writer 112 writes to another media type. Minification component 114 reduces the size of data stream 102a to produce a minified version: data stream 102. Media writer 112 writes data stream 102 (or in examples that do not perform minification, data stream 102a) and a verification code 106 to media 104. Thus, media 104 holds data stream 102 containing computer executable instructions in an interpreted language and verification code 106.

The minified version of the example program is given by:
var e,o;driver=(e=console.log,o=require("modules/passcode.js"),{init:function( ){var i=o.verify("5NiSmATYWBlnROsMl97G",276071347);throw e(i?"OK":"Failed"),"Finished."},destroy:function( ){ }});

Whereas the size of data stream 102a was 400 bytes, minified data stream 102 is only 191 bytes. This is a reduction of more than half of the program size, although the storage size on media 104 may change by a different amount due to encoding artifacts. For a comparison of the differing media capacity requirements, see FIG. 5. Data stream 102a is encoded as QR code 512 (size 65×65 pixels), and data stream 102 is encoded as QR code 508 (size 49×49 pixels). In some scenarios, minification speeds up loading and obfuscates the program, which increases the difficulty of reverse engineering. In some scenarios, the error correction level can be adjusted to enable larger programs to fit within the capacity of media 104.

Due to the prevalence of computer attacks, a security feature is included in some examples. Some smart cards offer cryptographic and security features, such as challenge-response exchanges, which can be invoked as part of its execution of the presentable program stored on the card. However, RFID and matrix barcode arrangements may benefit from the use of a verification code 106, which is generated by a verification code generator 116 in publisher 110. Verification code 106 reduces the likelihood that, if an attacker printed a QR code with a malicious program, the malicious program would be automatically run. Publisher 110 exports its certificate data to a certificate 168 in remote verification node 166 and/or a certificate 148 in a local verification component 146 within reader node 120.

A second security element is a user input passcode, that also acts as a permission mechanism for executing the presented program in data stream 102. Thus, there is a first execution permission, based on whether data stream 102 is signed, that determines whether data stream 102 can be executed at all. Then, after data stream 102 begins executing, the user's passcode is used to determine whether execution can continue for the specific user. Both security mechanisms are used to determine permission to execute, although, in some examples, some early start-up execution operations have begun in order to prompt the user for the passcode. Referencing the example programs above shows that salt text ("5NiSmATYWBlnROsMl97G") and an expected hash ("276071347") of the user's passcode plus the salt text are included. When the hashes match, the program will have permission to execute. In some examples, the salt text and the expected hash value form a verification code.

After it has been written, media 104 is available for eventual presentation to reader node 120. Reader node 120 includes a sensor 122, a writer 124, a user input component 132, and a presentation component 134. Sensor 122 can include one or more of a camera for imaging a matrix barcode, or a laser and sensor, an RFID tag reader (e.g., an RF transceiver and antenna), a smartcard reader/writer, and other sensors for reading presentable media. Some examples have multiple, different sensors. Writer 124 can include one or more of a printer, a smartcard reader/writer (which is a common component with a smartcard reader/writer-type sensor 122), and other types. User input component 132 can include one or more of a keypad, a touchscreen and others. Presentation component 134 can include user-readable displays, and can be a common component with user input component 132 for touchscreen configurations.

Executable logic components on reader node 120 include a user interface 130 that controls user input component 132 and presentation component 134, interpreted language execution environment 128, a permission component 126, a network interface 150 (which can also include hardware components) for communicating across network 160, a local function library 142, and a local verification component 146. A local operation component 170 performs tasks associated with reader node 120, which provides value for reader node 120. For example, local operation component 170 may control an actuator 172 that enables reader node 120 to interact with physical components 174 such as locks and machinery. Examples include reader node operating as a mobile device (e.g., smartphone), an industrial control (e.g., manufacturing robot controller), electronic lock, inventory management device, and other computerized tools.

In operation, media 104 is presented to reader node 120. Sensor 122 reads published data stream 102 and verification code 106, in order to import data stream 102 and verification code 106 into reader node 120. Reading published data stream 102 triggers reader node 120 to search for a signature and referenced functions. In some examples, permission component 126 checks data stream 102 by reference to verification code 106. Based at least on verification code 106, permission component 126 determines permission to execute, by reader node 120, the computer executable instructions contained within data stream 102. In some examples, data stream 102 is only imported into reader node 120 if data stream 102 is properly signed. In some examples, verification code 106 is verified using a digital security certificate (e.g., digital security certificate 148 or 168). In some examples, permission component 126 will also later verify a user's passcode, as a second permission stage, as will be described below.

In some examples, permission component 126 uses local verification component 146, which contains a digital security certificate 148 of the program's signer, to determine permission to import and/or execute data stream 102. Some examples connect with remote verification node 166, across network 160, to retrieve digital security certificate 168. Network 160 may be any computer network such as a local network or the internet. Thus, in some examples, determining permission to execute, by reader node 120, the computer executable instructions comprises determining, by remote verification node 166 across network 160 from reader node 120, the permission to execute, by reader node 120, the computer executable instructions. The presented program is only executed if properly signed, in such examples. For smart cards, some examples have an embedded secure key store and can process cryptographic operations, such as signing a challenge from reader node 120 with a private key in a secure store.

If the check passes, data stream 102 is passed to interpreted language execution environment 128, which starts the program. In some examples, the program in data stream 102 causes permission component 126 prompt the user (via user interface 130 and presentation component 134) to enter a passcode via user input component 132. Reader node 120 then receives user input from user input component 132. The user's passcode is passed to permission component 126 and/or interpreted language execution environment 128 via user interface 130, and a hash is performed to check against verification code 106 (e.g., a salt text and an expected hash value). In some examples, the passcode is checked by calling functions in local function library 142 or remote function library 162. In some examples, the user's passcode is verified by concatenating it with one or more salt values, then executing a cryptographic hash function, and checking the result against an expected value. The salt values and expected hash could be within data stream 102 as program parameters. Based at least on the received user input, permission component 126 determines permission to execute (e.g., permission to continue executing), by reader node 120, the computer executable instructions contained within data stream 102. Thus, based at least on verification code 106 or the received user input, permission component 126 determines permission to execute, by reader node 120, the computer executable instructions contained within data stream 102. Permission is communicated by permission component 126 to interpreted language execution environment 128, which then intakes and executes data stream 102. Thus, based at least on determining that execution is permitted, reader node 120 executes at least a portion of the computer executable instructions (within data stream 102) using interpreted language execution environment 128.

In some examples, the program (in data stream 102) includes a reference to a first executable function on reader node 120, for example function 144, within local function library 142. Executing the program then includes executing function 144 on reader node 120 as part of the program. In some examples, data stream 102 includes a reference to a second executable function, for example function 164, on remote function library node 162 that is remote from reader node 120. In such examples, reader node 120 retrieves, across network 160, function 164 from remote function library node 162. Executing the program then includes executing function 164 on reader node 120 as part of the program.

The referenced functions (functions 144 and 164) can include one or more of the following example functions: low-level connection to user input component 132 and presentation component 134; higher-level user interface features, including editing and display options; and a hashing algorithm. In some examples, reader node 120 can modify and publish a modified data stream 102b, for example, generating it with local operation component 170 and outputting it with writer 124 and/or displaying it on presentation component 134 (e.g., as a matrix barcode) for reading by another reader node 120. In some examples, interpreted language execution environment 128 generates modified data stream 102b, and in some examples, reader node 120 digitally signs modified data stream 102b, using certificate 148.

Figure 2:
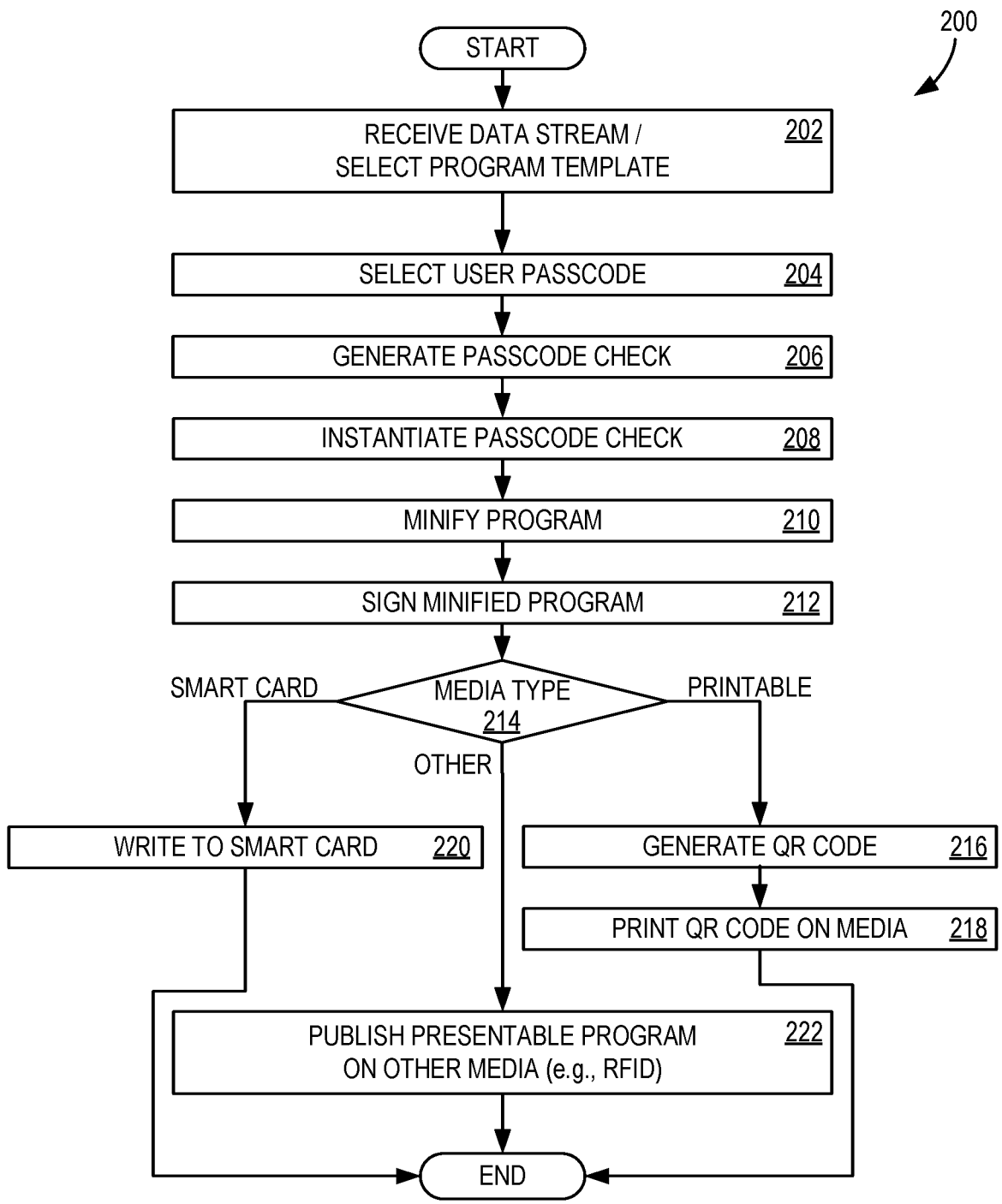
FIG. 2 illustrates a flow chart of exemplary operations associated with the architecture of FIG. 1.
Figure 3:
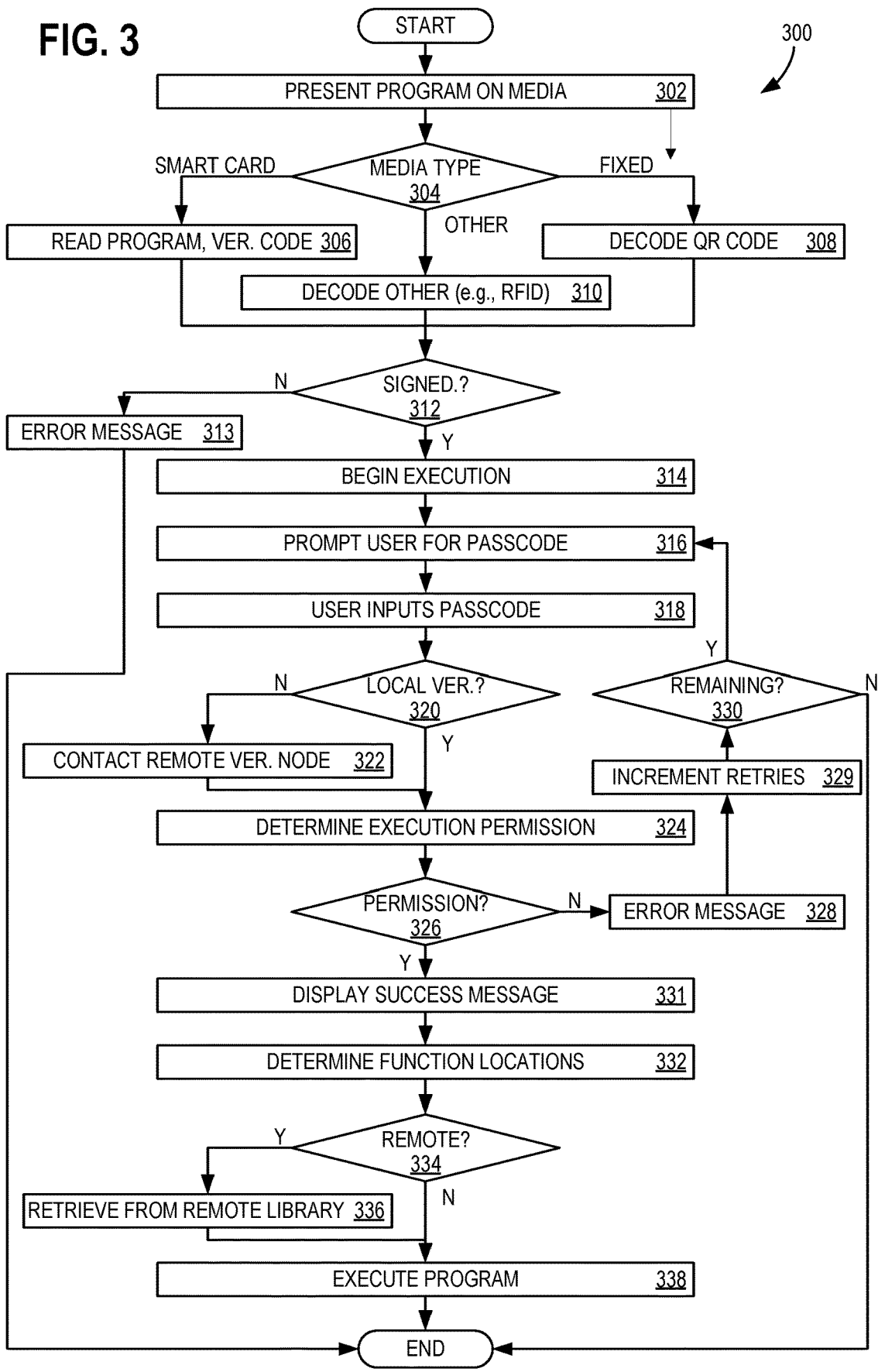
FIG. 3 illustrates another flow chart of exemplary operations associated with the architecture of FIG. 1.
Figure 4:
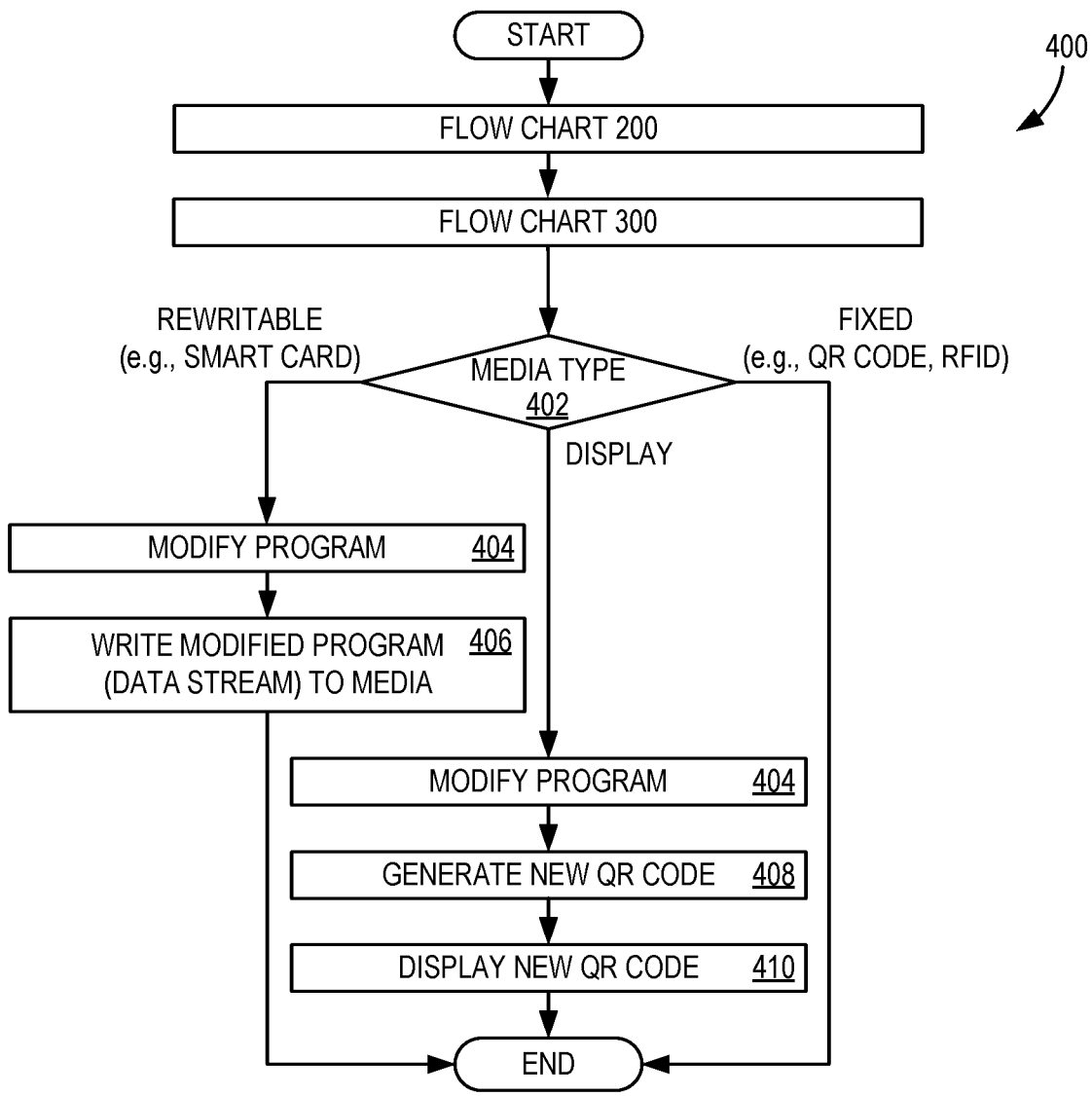
FIG. 4 illustrates another flow chart of exemplary operations associated with the architecture of FIG. 1.

The processing can be viewed in two primary stages: configuration and interaction. FIG. 2 illustrates a flow chart 200 of exemplary configuration operations for architecture 100, and FIG. 3 illustrates a flow chart 300 of exemplary interaction operations for architecture 100. FIG. 4 illustrates a flow chart 400 that links flow charts 200 and 300, and also illustrates additional exemplary operations.

Beginning with flow chart 200 (of FIG. 2), operation 202 includes receiving a data stream containing computer executable instructions in an interpreted language and selecting a program template. Operation 204 includes selecting a passcode for a user of reader node 120. Operation 206 includes generating a verification code which is to be used to verify the passcode. Random salt text and a cryptographic hash of the salt plus the passcode is used in some examples. Operation 208 includes instantiating the verification code into the code template, to generate the presentable program (e.g., a data stream with executable instructions and the verification code). Operation 210 includes minifying the data stream, which is signed in operation 212. Decision operation 214 determines the media type, such as smart card, RFID tag, and printable media.

For printable media that will host a matrix barcode, the matrix barcode pattern (e.g., QR code) is generated in operation 216 and printed on the media surface in operation 218. For a smart card, operation 220 stores (writes) the data stream and the verification code on the smart card. For other media types (e.g., RFID tags) operation 222 encodes the data stream and the verification code on the media. At this point, the data stream and the verification code have been published on the media.

Turning now to FIG. 3, operation 302 includes presenting a program on a media. Decision operation 304 determines the media type. Operations 306-310 each includes reading, using a sensor, the published data stream and verification code at a reader node, based on the media type. A matrix barcode is decoded in operation 308, an RFID or other type of media is decoded in operation 310. For a smart card, the published data stream and verification code may be simply read with a reader in operation 306, although in some examples decoding may be necessary.

Decision operation 312 determines whether the data stream had been properly signed. If not, either because there is no signature, or the signature does not match the correct signature, an error message is displayed in 313. Flow chart 300 then terminates for lack of permission to execute the program. In some examples, the remote verification node is contacted for a digital certificate of authorized signatories. That is, in some examples, operations 320 and 322 (see below) are also performed in conjunction with operation 312. If so, early execution begins in operation 314 to check the user's passcode, although, in some examples, execution of specific data stream logic does not yet commence. Operation 316 prompts the user for the passcode, which is entered in operation 318 and received as user input. In some examples, the user enters a passcode on a keypad attached to the reader node. In some examples, the keypad offers backspace editing and the option to reveal or conceal the passcode during entry. Decision operation 320 determines whether verification (e.g., determination of permission to execute) is to be performed locally or in conjunction with a remote verification node. If a remote verification node is to be used, it is contacted in operation 322. In some examples, the signature is verified with the remote node, so operations 320 and 322 are also used along with decision operation 312. Operation 324 includes, based at least on the verification code and the received user input, determining permission to execute, by the reader node, the computer executable instructions.

If the permission fails in decision operation 326, such as the incorrect passcode is entered or the signer's digital security certificate does not match, an error message is displayed in operation 328. The user can try again, up to a maximum number of retries. A retry counter is incremented in operation 329. The current number of retries is checked in decision operation 330 to determine whether any retries remain, and whether the user wishes to retry or quit. If retries remain, and the user wishes to retry, flow chart 300 returns to operation 316. Otherwise (no retries remain, or user opts to quit), flowchart 330 terminates. If permission is granted in operation 326, a success message is optionally displayed in operation 331. The locations of all functions referenced by the program, but which are not defined within the program, are determined in operation 332. If a remote function (e.g., a function not local within the reader node) is identified in decision operation 334, it is retrieved form a remote function library node, in operation 336. The program is then executed on the reader node in operation 338.

Turning now to FIG. 4, flow chart 400 indicates that the operations of flow chart 200 are followed by the operations of flow chart 300. Additionally, in this illustrated example, the reader node generates a modified program and publishes it, for some types of media. Decision operation 402 determines the media type. If the media type is fixed (e.g., matrix barcode or RFID tag), the reader node does not publish a modified program or data stream. For a smart card, the reader node modifies the program in operation 404 and writes the data stream to the smart card in operation 406.

For a reader node with a display, the program is modified as in operation 404 and the QR code (or other matrix barcode format) is generated in operation 408 and shown on the display in operation 410. Another reader node can then image the display and execute the modified program. An example of a modified program is a program that is authorized to execute with a different user's passcode. In such a scenario, a first user can execute a program and modify the presented program to permit another user to then execute it. A scenario like this can be useful if a particular program is to be executed by a set of users, sequentially.

Figure 5:
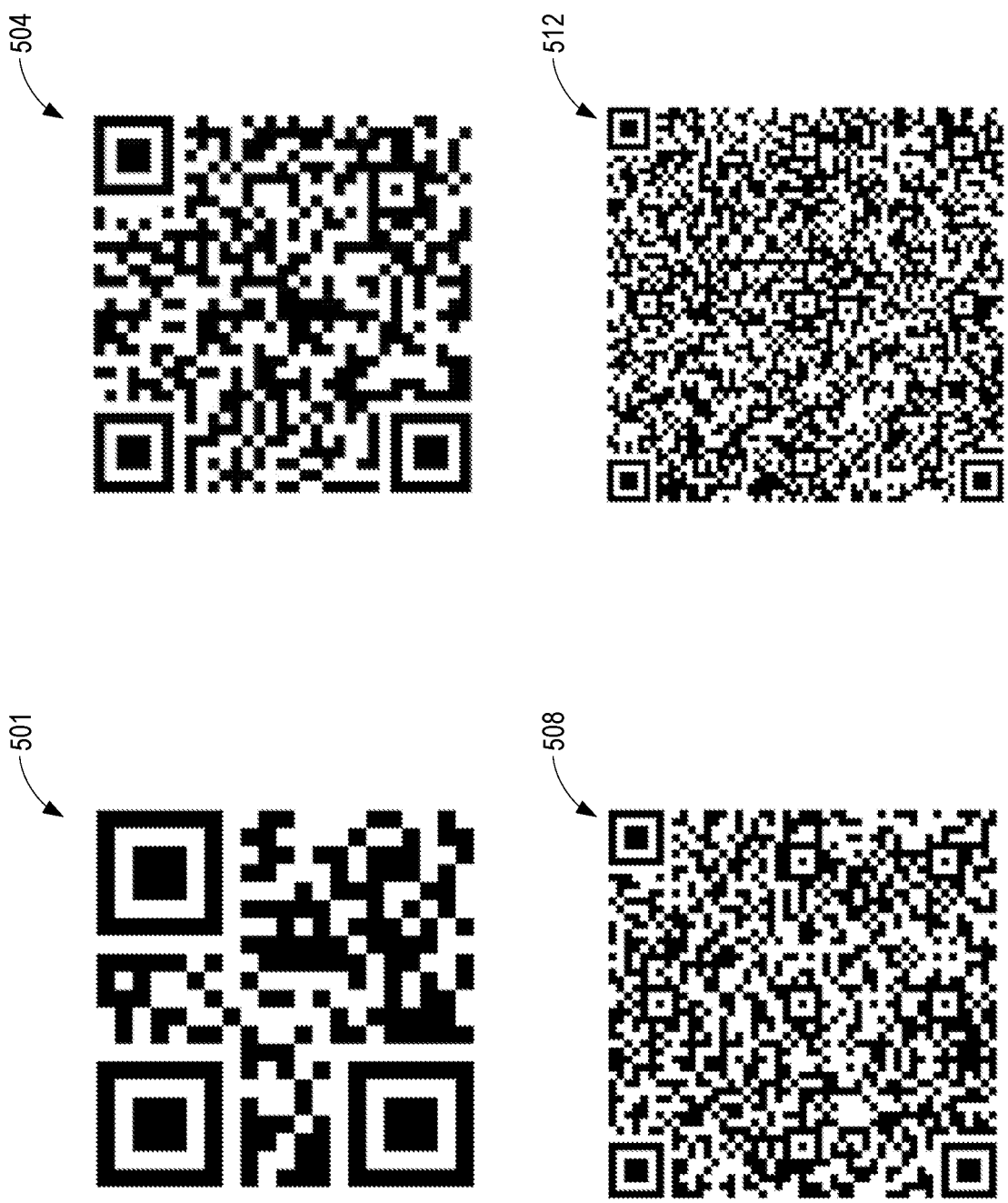
FIG. 5 illustrates a set of example QR codes.

FIG. 5 illustrates a set of example QR codes 501, 504, 508, and 512. QR codes range from 21×21 pixels (version 1) to 177×177 pixels (version 40). The size is related to the version number by the relationship:

$$N = 4 \times V + 17 \qquad \text{Eq. (1)}$$

where N is the count of pixels along one dimension, and V is the version number. QR codes have multiple levels of error correction, with higher error correction settings providing the ability to recover a larger number of decoding errors, at the cost of information capacity. QR code capacity, in bytes, can be approximated by:

$$C \cong 0.8 \times V^2 \qquad \text{Eq. (2)}$$

where C is the capacity in bytes. For example, for V=40, the capacity is from 1273 bytes, 1663 bytes, 2331 bytes, or 2953 bytes, based on the error correction setting. QR code 501 illustrates a version 1 QR code, with size 21×21 pixels; QR code 504 illustrates a version 4 QR code, with size 33×33 pixels; QR code 508 illustrates a version 8 QR code, with size 49×49 pixels; and QR code 512 illustrates a version 12 QR code, with size 65×65 pixels. QR code 512 holds the initial example JavaScript® program of data stream 102a, and QR code 508 holds the minified example JavaScript® program of data stream 102.

Thus, in this example, minification has reduced the QR code size from 65×65 pixels (4225 total) to 49×49 pixels (2401 total), which is a reduction of 43%. For a given size QR code, with this example, minification allows a 76% larger program. Another option for increasing the size of a program that can fit into a QR code of a given size is to reduce the error correction level, by moving from a higher error correction setting to a lower error correction setting. Other matrix barcodes, besides QR codes, are used in some examples.

Figure 6:
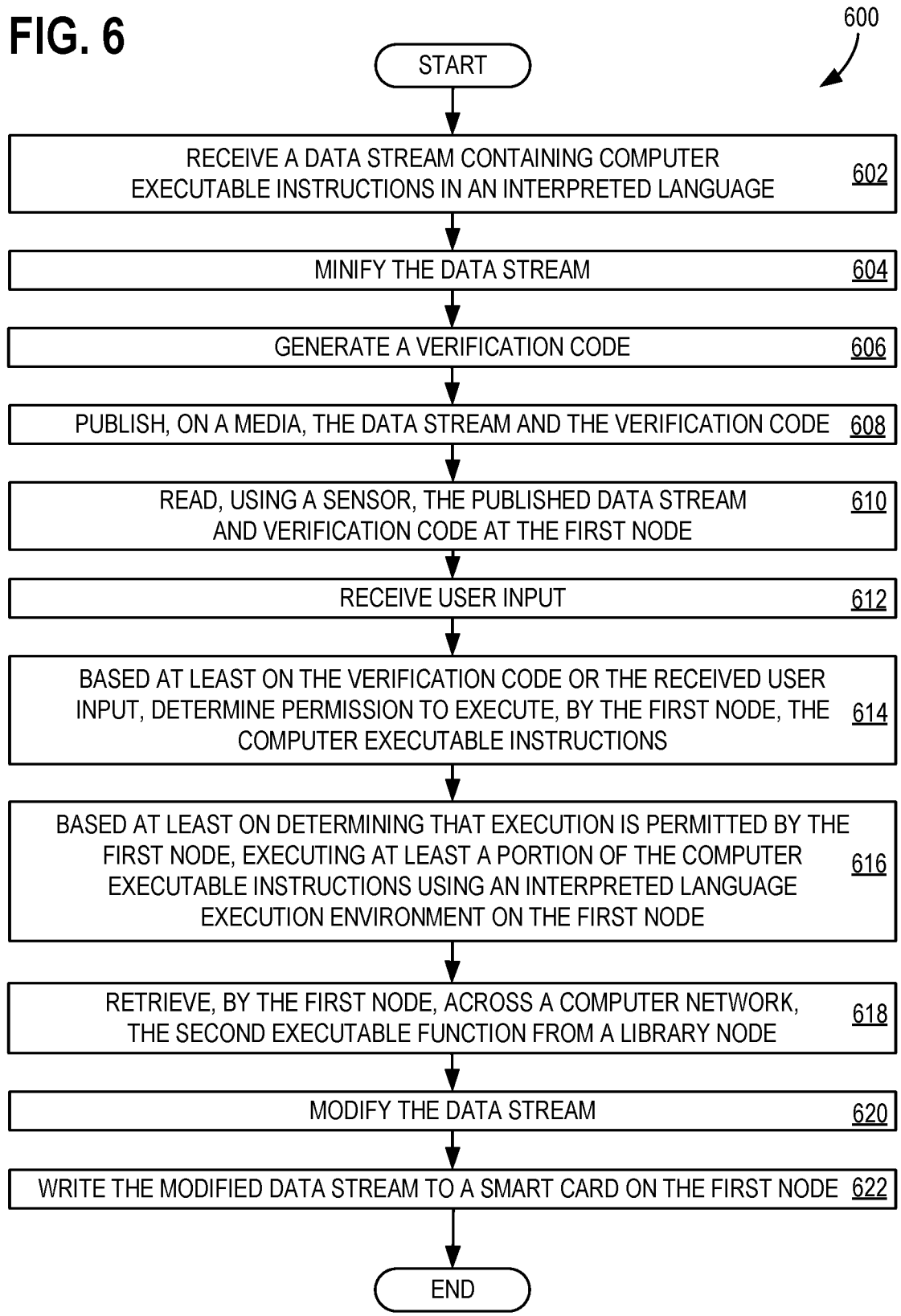
FIG. 6 illustrates another flow chart corresponding to the activity indicated in FIG. 1, according to an example embodiment.

FIG. 6 illustrates a flow chart 600, showing a method for presenting programs that may be used with architecture 100. Flow chart 600 provides alternative views of at least some of the operations of flow charts 200, 300, and 400. In some examples, the operations of flow chart 600 are performed by one or more computing devices 700 (of FIG. 7). Operation 602 includes receiving a data stream containing computer executable instructions in an interpreted language. In some examples, the interpreted language is JavaScript® or Python®. Operation 604 includes minifying the data stream. Thus, in some examples, the data stream comprises a minified data stream. Operation 606 includes generating a verification code (e.g., signing the data stream), and operation 608 includes publishing, on a media, the data stream and the verification code. In some examples, operation 608 includes adjusting an error correction level to fit a program within the capacity of the media.

In some examples, the media comprises a matrix barcode, and publishing the data stream and the verification code on the media comprises printing a matrix barcode. In some examples, the media comprises a smart card, and publishing the data stream and the verification code on the media comprises storing the data stream and the verification code on a smart card. In some examples, the media comprises an RFID tag, and publishing the data stream and the verification code on the media comprises encoding an RFID tag. In some examples, the published data stream includes a reference to a first executable function on the reader node.

Operation 610 includes reading, using a sensor, the published data stream and verification code at the reader node. In some examples, reading the published data stream and verification code using the sensor comprises imaging the matrix barcode with a camera, a barcode reader, or other light sensor. In some examples, the sensor comprises a camera, a barcode reader, or another light sensor, and reading the published data stream and verification code using the sensor comprises imaging a matrix barcode with the camera. In some examples, the sensor comprises a smart card reader, and reading the published data stream and verification code using the sensor comprises reading a smart card with the smart card reader. In some examples, the sensor comprises an RFID tag reader, and reading the published data stream and verification code using the sensor comprises reading an RFID tag with the RFID tag reader. In some examples, the data stream includes a reference to a first executable function on the reader node. In some examples, the data stream includes a reference to a second executable function on a library node remote from the reader node.

Operation 612 includes receiving user input. Operation 614 includes, based at least on the verification code or the received user input, determining permission to execute, by the reader node, the computer executable instructions. In some examples, determining permission to execute, by the reader node, the computer executable instructions includes determining, by a verification node across a computer network from the reader node (a remote verification node), the permission to execute, by the reader node, the computer executable instructions. In such examples, operation 614 includes contacting the remote verification node.

Operation 616 includes based at least on determining that execution is permitted by the reader node, executing at least a portion of the computer executable instructions using an interpreted language execution environment on the reader node. In examples for which the data stream includes a reference to an executable function on the reader node, operation 616 includes executing the first executable function on the reader node. In examples for which the data stream includes a reference to an executable function on a library node remote from the reader node (a remote executable function), operation 618 includes retrieving, by the reader node, across a computer network, the remote executable function from the library node. In some such examples, operation 616 also includes executing the remote executable function on the reader node. In some examples, however, operation 618 includes executing the remote executable function on a remote node. In some examples, operation 618 is not needed.

In some examples in which re-writable media or a display is used (that can display a QR code), operation 620 includes modifying the data stream. In some such examples, operation 622 includes writing the modified data stream to a smart card on the reader node. In some examples, operation 622 includes generating and displaying a QR code for the modified data stream on a display. The modified data stream is a modified executable program or has a modified verification code for another user to execute the presented program.

Figure 7:
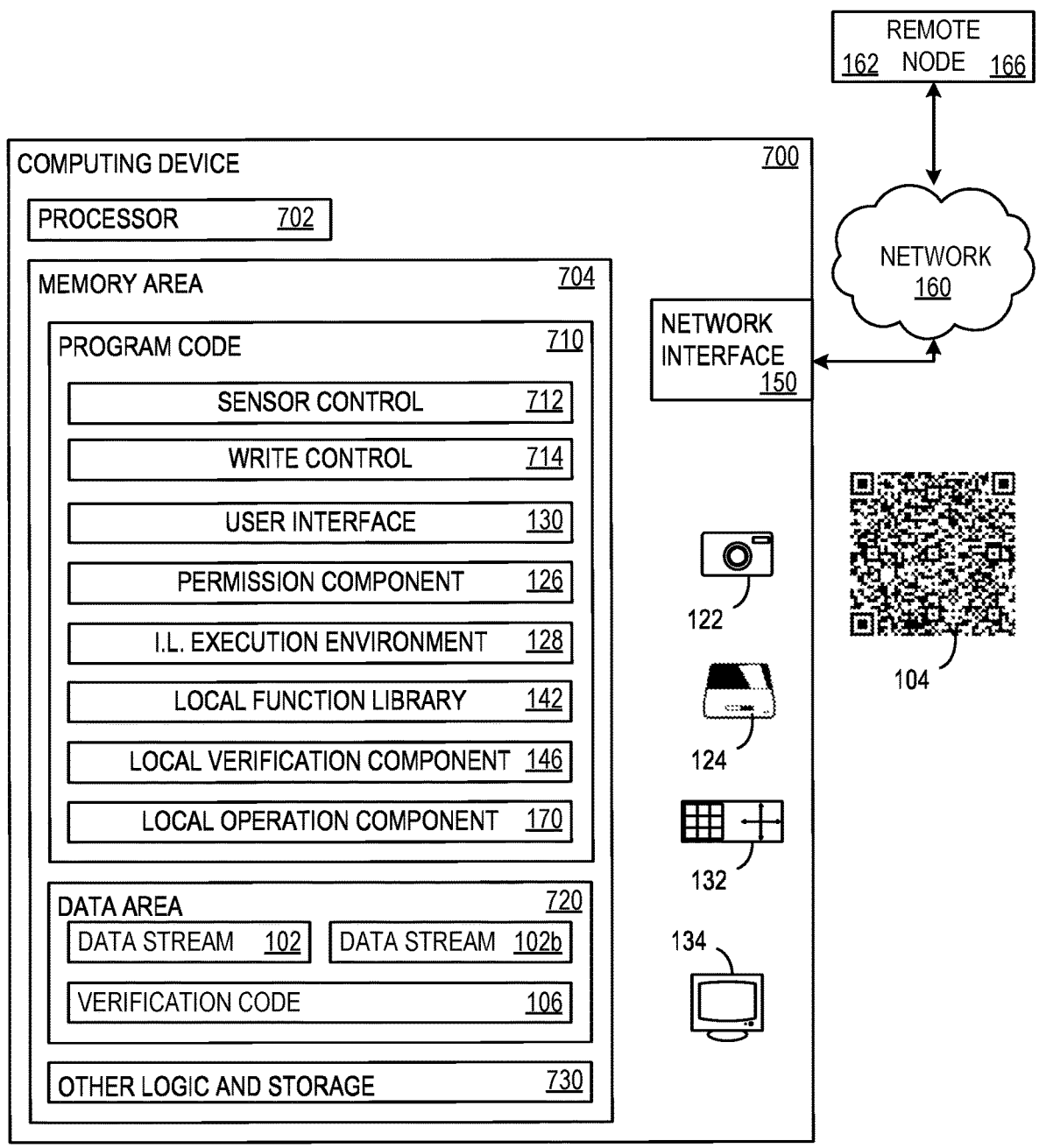
FIG. 7 illustrates a block diagram of a computing device that may be used with the architecture of FIG. 1, according to an example embodiment.

FIG. 7 illustrates a block diagram of computing device 700 that employs caching, and that may be used with the architecture of FIG. 1. With reference to FIG. 1, computing device 700 may be used for any of reader node 120, publisher 110, remote function library node 162, and remote verification node 166. Computing device 700 has at least a processor 702 and a memory area 704 (or memory 704) that holds program code 710, a data area 720, and other logic and storage 730. Memory area 704 is any device allowing information, such as computer executable instructions and/or other data, to be stored and retrieved. For example, memory area 704 may include one or more random access memory (RAM) modules, flash memory modules, hard disks, solid-state disks, and/or optical disks. Program code 710 comprises computer executable instructions, and computer executable components including a sensor control 712, a write control 714, user interface 130, permission component 126, interpreted language execution environment 128, local function library 142, local verification component 146, and local operation component 170.

A data area 720 holds data stream 102, modified data stream 102b, and verification code 106. Memory area 704 also includes other logic and storage 730 that performs or facilitates other functions required of computing device 700. Network interface 150 permits communication over network 160 with remote nodes 162 and 166. Sensor 122 reads media 104 (illustrated here as a QR code, but which may be a different media type), under the control of sensor control 712. Writer 124 writes to media 104 or displays a QR code on presentation component 134. User input component 132 (illustrated here as a keypad and trackpad, but which may include different input components) accepts input from a user to control computing device 700 in performing the processes described herein.

Computing device 700 represents any device executing instructions (e.g., as application programs, operating system functionality, or both) to implement the operations and functionality described herein. Computing device 700 may include any portable or non-portable device including a mobile telephone, laptop, tablet, computing pad, netbook, gaming device, portable media player, desktop personal computer, kiosk, embedded device, and/or tabletop device. Additionally, computing device 700 may represent a group of processing units or other computing devices, such as in a cloud computing system or service. Processor 702 may include any quantity of processing units and may be programmed to execute any components of program code 710 comprising computer executable instructions for implementing aspects of the disclosure. In some embodiments, processor 702 is programmed to execute instructions such as those illustrated in the figures.

Additional Examples

An example system for presentable programs may comprise: a media holding a data stream containing computer executable instructions in an interpreted language and a verification code; and a reader node comprising: a sensor; a user input component; an interpreted language execution environment; a processor; and a computer-readable medium storing instructions that are operative upon execution by the processor to: read, using the sensor, a published data stream and verification code at the reader node; receive user input from the user input component; based at least on the verification code or the received user input, determine permission to execute, by the reader node, the computer executable instructions; and based at least on determining that execution is permitted by the reader node, execute at least a portion of the computer executable instructions using the interpreted language execution environment.

Another example system for presentable programs may comprise: a processor; and a computer-readable medium storing instructions that are operative upon execution by the processor to: receive a data stream containing computer executable; generate a verification code; publish, on a media, the data stream and the verification code; read, using a sensor, the published data stream and verification code at a reader node; receive user input; based at least on the verification code or the received user input, determine permission to execute, by the reader node, the computer executable instructions; and based at least on determining that execution is permitted by the reader node, execute at least a portion of the computer executable instructions on the reader node.

An exemplary method of presenting programs may comprise: receiving a data stream containing computer executable instructions; generating a verification code; publishing, on a media, the data stream and the verification code; reading, using a sensor, the published data stream and verification code at a reader node; receiving user input; based at least on the verification code or the received user input, determining permission to execute, by the reader node, the computer executable instructions; and based at least on determining that execution is permitted by the reader node, executing at least a portion of the computer executable instructions on the reader node.

One or more exemplary non-transitory computer storage media having computer-executable instructions that, upon execution by a processor, may cause the processor to at least perform operations that comprise: receiving a data stream containing computer executable instructions in an interpreted language; minifying the data stream; generating a verification code; publishing, on a media, the data stream and the verification code, wherein publishing the data stream and the verification code on the media comprises printing a matrix barcode, wherein the published data stream includes a reference to a first executable function on the reader node; reading, using a sensor, the published data stream and verification code at the reader node, wherein reading the published data stream and verification code using the sensor comprises imaging the matrix barcode with a camera; receiving user input; based at least on the verification code or the received user input, determining permission to execute, by the reader node, the computer executable instructions; and based at least on determining that execution is permitted by the reader node, executing at least a portion of the computer executable instructions using an interpreted language execution environment on the reader node, wherein executing at least a portion of the computer executable instructions comprises executing the first executable function on the reader node.

Alternatively, or in addition to the other examples described herein, examples include any combination of the following:
- determining permission to execute, by the reader node, the computer executable instructions comprises determining, by a verification node across a computer network from the reader node, the permission to execute, by the reader node, the computer executable instructions;
- the media comprises a matrix barcode;
- the media comprises an RFID tag;
- publishing the data stream and the verification code on the media comprises printing a matrix barcode;
- the sensor comprises a camera;
- the sensor comprises a barcode reader;
- the sensor comprises a light sensor;
- receiving a data stream containing computer executable instructions in an interpreted language;
- executing at least a portion of the computer executable instructions using an interpreted language execution environment on the reader node;
- reading the published data stream and verification code using the sensor comprises imaging the matrix barcode with a camera;
- the media comprises a smart card;
- publishing the data stream and the verification code on the media comprises storing the data stream and the verification code on a smart card;
- the sensor comprises a smart card reader;
- reading the published data stream and verification code using the sensor comprises reading the smart card with a smart card reader;
- after executing at least a portion of the computer executable instructions, writing a modified data stream to the smart card on the reader node;
- the data stream comprises a minified data stream;
- prior to publishing the data stream, minifying the data stream;
- the data stream includes a reference to a first executable function on the reader node;
- executing the first executable function on the reader node;
- the data stream includes a reference to a second executable function on a library node remote from the reader node;
- retrieving, by the reader node, across a computer network, the second executable function from the library node;
- executing the second executable function on the reader node; and
- the interpreted language is a language selected from the list consisting of JavaScript® and Python®.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The examples illustrated and described herein as well as examples not specifically described herein but within the scope of aspects of the invention constitute exemplary means for presenting programs. For example, the elements illustrated in the figures, such as when encoded to perform the operations illustrated in the figures, constitute exemplary means for reading, using a sensor, a data stream containing computer executable instructions in an interpreted language, and exemplary means for determining permission to execute the computer executable instructions, and based at least on determining that execution is permitted, executing at least a portion of the computer executable instructions.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices.

Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for presentable programs, the system comprising:
 a processor; and
 a computer-readable medium storing instructions that are operative upon execution by the processor to:
  receive a data stream containing computer executable instructions;
  generate a verification code;
  publish, on a media, the data stream and the verification code;
  read, using a sensor, the published data stream and verification code at a reader node;
  receive user input;

based at least on the verification code or the received user input, determine permission to execute, by the reader node, the computer executable instructions; and based at least on determining that execution is permitted by the reader node, execute at least a portion of the computer executable instructions on the reader node.

2. The system of claim 1, wherein determining permission to execute, by the reader node, the computer executable instructions comprises:

determining, by a verification node across a computer network from the reader node, the permission to execute, by the reader node, the computer executable instructions.

3. The system of claim 1, wherein publishing the data stream and the verification code on the media comprises printing a matrix barcode and wherein reading the published data stream and verification code using the sensor comprises imaging the matrix barcode with a camera, barcode reader, or other light sensor.

4. The system of claim 1, wherein publishing the data stream and the verification code on the media comprises storing the data stream and the verification code on a smart card and wherein reading the published data stream and verification code using the sensor comprises reading the smart card with a smart card reader.

5. The system of claim 1,
wherein receiving a data stream containing computer executable instructions comprises receiving a data stream containing computer executable instructions in an interpreted language;
wherein executing at least a portion of the computer executable instructions on the reader node comprises executing at least a portion of the computer executable instructions using an interpreted language execution environment on the reader node;
wherein the data stream includes a reference to a first executable function on the reader node; and
wherein the instructions are further operative to execute the first executable function on the reader node.

6. The system of claim 1, wherein the data stream includes a reference to a second executable function on a library node remote from the reader node, and wherein the instructions are further operative to:
retrieve, across a computer network, the second executable function from the library node; and
execute the second executable function on the reader node.

7. A method for presenting programs, the method comprising:
receiving a data stream containing computer executable instructions;
generating a verification code;
publishing, on a media, the data stream and the verification code;
reading, using a sensor, the published data stream and verification code at a reader node;
receiving user input;
based at least on the verification code or the received user input, determining permission to execute, by the reader node, the computer executable instructions; and
based at least on determining that execution is permitted by the reader node, executing at least a portion of the computer executable instructions on the reader node.

8. The method of claim 7, wherein determining permission to execute, by the reader node, the computer executable instructions comprises:
determining, by a verification node across a computer network from the reader node, the permission to execute, by the reader node, the computer executable instructions.

9. The method of claim 7, wherein publishing the data stream and the verification code on the media comprises printing a matrix barcode and wherein reading the published data stream and verification code using the sensor comprises imaging the matrix barcode with a camera, barcode reader, or other light sensor.

10. The method of claim 7, wherein publishing the data stream and the verification code on the media comprises storing the data stream and the verification code on a smart card and wherein reading the published data stream and verification code using the sensor comprises reading the smart card with a smart card reader.

11. The method of claim 7,
wherein receiving a data stream containing computer executable instructions comprises receiving a data stream containing computer executable instructions in an interpreted language;
wherein executing at least a portion of the computer executable instructions using an interpreted language execution environment on the reader node comprises executing at least a portion of the computer executable instructions using an interpreted language execution environment on the reader node;
wherein the published data stream includes a reference to a first executable function on the reader node, and
wherein the method further comprises executing the first executable function on the reader node.

12. The method of claim 7, wherein the published data stream includes a reference to a second executable function on a library node remote from the reader node, and
wherein the method further comprises:
retrieving, by the reader node, across a computer network, the second executable function from the library node; and
executing the second executable function on the reader node.

13. A non-transitory computer storage medium having computer-executable instructions that, upon execution by a processor, cause the processor to at least perform operations comprising:
receiving a data stream containing computer executable instructions in an interpreted language;
generating a verification code;
publishing, on a media, the data stream and the verification code;
reading, using a sensor, the published data stream and verification code at a reader node;
receiving user input;
based at least on the verification code or the received user input, determining permission to execute, by the reader node, the computer executable instructions; and
based at least on determining that execution is permitted by the reader node, executing at least a portion of the computer executable instructions using an interpreted language execution environment on the reader node.

14. The non-transitory computer storage medium of claim 13, wherein determining permission to execute, by the reader node, the computer executable instructions comprises:

determining, by a verification node across a computer network from the reader node, the permission to execute, by the reader node, the computer executable instructions.

15. The non-transitory computer storage medium of claim 13, wherein publishing the data stream and the verification code on the media comprises printing a matrix barcode and wherein reading the published data stream and verification code using the sensor comprises imaging the matrix barcode with a camera, barcode reader, or other light sensor.

16. The non-transitory computer storage medium of claim 13, wherein publishing the data stream and the verification code on the media comprises storing the data stream and the verification code on a smart card and wherein reading the published data stream and verification code using the sensor comprises reading the smart card with a smart card reader.

17. The non-transitory computer storage medium of claim 13, wherein the operations further comprise:
   after executing at least a portion of the computer executable instructions, writing a modified data stream to the smart card on the reader node.

18. The non-transitory computer storage medium of claim 13, wherein the published data stream includes a reference to a first executable function on the reader node, and
   wherein the method further comprises executing the first executable function on the reader node.

19. The non-transitory computer storage medium of claim 13, wherein the published data stream includes a reference to a second executable function on a library node remote from the reader node, and
   wherein the method further comprises:
      retrieving, by the reader node, across a computer network, the second executable function from the library node; and
      executing the second executable function on the reader node.

20. The non-transitory computer storage medium of claim 18, wherein the interpreted language is a scripting language.

* * * * *